United States Patent
Zhu et al.

(10) Patent No.: US 11,126,036 B2
(45) Date of Patent: Sep. 21, 2021

(54) BACKLIGHT MODULE ASSEMBLY, STRUCTURAL ADJUSTMENT METHOD THEREOF AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Jiang Zhu, Beijing (CN); Hongchao He, Beijing (CN); Jianghui Zhan, Beijing (CN); Rui Wang, Beijing (CN); Yuxi Dong, Beijing (CN); Changjun Zhang, Beijing (CN); Bo Zhang, Beijing (CN); Dan Liu, Beijing (CN); Tongmin Liu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/820,771

(22) Filed: Mar. 17, 2020

(65) Prior Publication Data
US 2020/0218119 A1 Jul. 9, 2020

Related U.S. Application Data

(63) Continuation of application No. 15/758,731, filed as application No. PCT/CN2017/101148 on Sep. 9, 2017, now abandoned.

(30) Foreign Application Priority Data

Feb. 28, 2017 (CN) .......................... 201710113620.X

(51) Int. Cl.
*G02F 1/13357* (2006.01)

(52) U.S. Cl.
CPC ............................. *G02F 1/133608* (2013.01)

(58) Field of Classification Search
CPC ... G02F 1/133615; G02F 2001/133314; G02F 2001/133317; G02F 1/1339; G02F 2001/133519; G02F 2201/50
(Continued)

(56) References Cited

U.S. PATENT DOCUMENTS 9,188,800 B2 11/2015 Yu
9,568,664 B2 2/2017 Cho et al.
(Continued)

FOREIGN PATENT DOCUMENTS

CN 101046569 10/2007
CN 101308272 11/2008
(Continued)

OTHER PUBLICATIONS

Office action from U.S. Appl. No. 15/758,731 dated Mar. 27, 2019.
(Continued)

*Primary Examiner* — William J Carter
(74) *Attorney, Agent, or Firm* — Calfee, Halter & Griswold LLP

(57) ABSTRACT

The present disclosure provides a backlight module assembly, structural adjustment method thereof and display device. The backlight module assembly includes a plastic frame, a film and an adjustment sheet. The plastic frame is presented in a box shape with an opening on the top, and has side walls and a bottom wall, and a space enclosed by the side walls and the bottom wall being a mounting groove. The film is arranged on the bottom wall and received within the mounting groove. The adjustment sheet is arranged on an inner side of the side wall of the mounting groove.

14 Claims, 2 Drawing Sheets

(58) Field of Classification Search
USPC .................................................. 362/600–634
See application file for complete search history.

(56) References Cited

U.S. PATENT DOCUMENTS

| | | | | |
|---|---|---|---|---|
| 2008/0019133 | A1* | 1/2008 | Kim | H01L 33/642 362/294 |
| 2011/0044046 | A1* | 2/2011 | Abu-Ageel | F21K 9/68 362/259 |
| 2015/0124191 | A1* | 5/2015 | Yu | G02F 1/133308 349/58 |
| 2015/0219311 | A1* | 8/2015 | Cho | G02B 5/0242 362/608 |
| 2017/0130933 | A1 | 5/2017 | Cho et al. | |

FOREIGN PATENT DOCUMENTS

| | | |
|---|---|---|
| CN | 101893211 | 11/2010 |
| CN | 202660373 | 1/2013 |
| CN | 203037958 | 7/2013 |
| CN | 20341666 | 10/2013 |
| CN | 203241666 | 10/2013 |
| CN | 103543543 | 1/2014 |
| CN | 104062782 | 9/2014 |
| CN | 203848112 | 9/2014 |
| CN | 104763944 | 7/2015 |
| CN | 104865748 | 8/2015 |
| CN | 105093673 | 11/2015 |
| CN | 105425437 | 3/2016 |
| CN | 105589267 | 5/2016 |
| CN | 107065300 | 8/2017 |

OTHER PUBLICATIONS

Office action from U.S. Appl. No. 15/758,731 dated Aug. 28, 2019.
Office action from U.S. Appl. No. 15/758,731 dated Dec. 19, 2019.
International Search Report and Written Opinion from PCT/CN2017/101148 dated Nov. 30, 2017.
Office action from Chinese Application No. 201710113620.X dated Jul. 3, 2019.
Office action from Chinese Application No. 201710113620.X dated Oct. 9, 2019.

* cited by examiner

BACKLIGHT MODULE ASSEMBLY, STRUCTURAL ADJUSTMENT METHOD THEREOF AND DISPLAY DEVICE

CROSS REFERENCE OF RELATED APPLICATIONS

The present application is a continuation application of U.S. Ser. No. 15/758,731, filed on Mar. 9, 2018, which is the national stage entry of PCT International Application No. PCT/CN2017/101148, filed on Sep. 9, 2017, which is based upon and claims priority to Chinese Patent Application No. 201710113620.X, filed on Feb. 28, 2017, and the entire disclosures of which are incorporated herein by reference.

TECHNICAL FIELD

The present disclosure relates to but not limits to a liquid crystal display technique, particularly to a backlight module assembly, a structural adjustment method of the backlight module assembly and a display device.

BACKGROUND

It is greatly required for information display while the society is being informationalized. At present, the most popular displaying way on the market is a liquid crystal display. The liquid crystal display may realize grayscale display by controlling liquid crystal rotation by using electric field, and furthermore, may realize colorful display by means of a color film. The liquid crystal display has excellent performances, such as thin, light weight and lower power consumption, thereby has been used in computers, TVs and mobile terminal displayers.

The Background portion contains the contents which are merely used for reinforcing understanding of the background technology of the present disclosure, and thus may include information that does not constitute the prior art as already known by an ordinary person skilled in the art.

SUMMARY

An embodiment of the present disclosure provides a backlight module assembly, which includes a plastic frame, a film and a adjustment sheet. The plastic frame is presented in a box shape with an opening on the top, and has side walls and a bottom wall, and a space enclosed by the side walls and the bottom wall being a mounting groove. The film is arranged on the bottom wall and received within the mounting groove. The adjustment sheet is arranged on an inner side of the side wall of the mounting groove.

In an embodiment, the adjustment sheet includes a vertical part and a horizontal part, a first set distance is provided between the vertical part and the film, and a second set distance is provided between an outer end face of the horizontal part and the film.

In an embodiment, a limiting slot is provided in the inner side on a top of the side wall of the mounting groove, and the horizontal part is fit in the limiting slot.

In an embodiment, the plastic frame is rectangular and has four side walls, there are three adjustment sheets which are correspondingly arranged on the three side walls of the plastic frame, and the adjustment sheet located in the middle abuts against the adjustment sheets located on the both sides.

In an embodiment, the plastic frame is an unitary structure.

In an embodiment, the adjustment sheet has absorbance areas with different absorbance.

An embodiment of the present disclosure further provides a display device, which includes the backlight module assembly according to any one of the above embodiments and a display unit which is arranged on a top end face of the adjustment sheet.

An embodiment of the present disclosure further provides a structural adjustment method for a backlight module assembly. The backlight module assembly includes an plastic frame, which is presented in a box shape with an opening on its top, having side walls and a bottom wall, and a space enclosed by the side walls and the bottom wall being a mounting groove; a film, which is arranged on the bottom wall and received within the mounting groove; and a adjustment sheet, which is arranged on an inner side of the side wall of the mounting groove, the structural adjustment method for the backlight module assembly is adaptive to size adjustment of the film, adjustment of the second set distance, size adjustment of a display unit and/or adjustment of the first set distance by changing size of the adjustment sheet.

In an embodiment, the adjustment sheet including a vertical part and a horizontal part, a first set distance being provided between the vertical part and the film, and a second set distance being provided between an outer end face of the horizontal part and the film, the structural adjustment method for the backlight module assembly is adapting to thickness adjustment of the film, adjustment of the second set distance and/or thickness adjustment of the display unit by changing thickness of the horizontal part of the adjustment sheet; and adapting to length adjustment of the film, width adjustment of the film, adjustment of the first set distance, a length adjustment of the display unit and/or width adjustment of the display unit by changing width of the vertical part of the adjustment sheet.

In an embodiment, bright areas and dark areas at an edge of the display unit are adjusted by changing absorbance of the absorbance areas on the vertical part of the adjustment sheet.

Other features and advantages of the present disclosure will be set forth in detail in the following description and in part will become apparent or may be learned from practice of the present disclosure. The objects and other advantages of the present disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and constitute a part of this application, illustrate embodiment(s) of the disclosure and together with the description serve to explain the technical solution of the disclosure but not be construed as limiting to the technical solution of the present disclosure.

Figure 1:
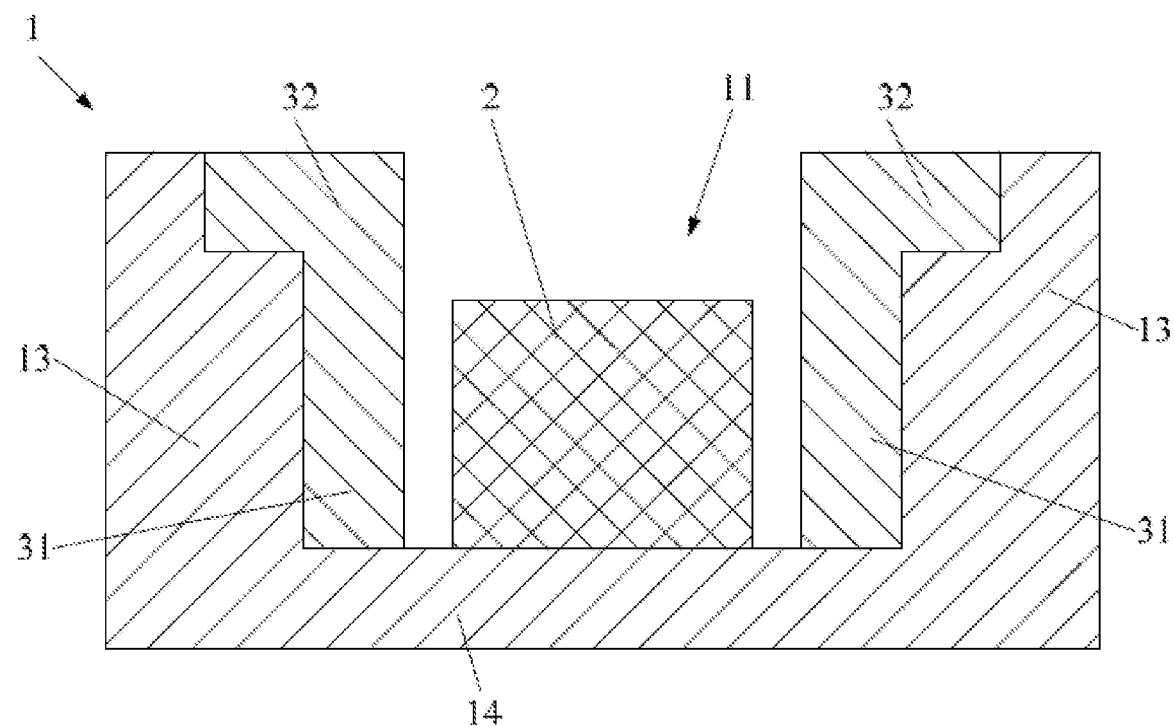
FIG. 1 is a sectional schematic view of a backlight module assembly according to one embodiment of the present disclosure.

Wherein, 1. plastic frame; 11. mounting groove; 12. limiting slot; 2. film; 3. adjustment sheet; 31. vertical part; 32. horizontal part; 4. display unit.

DETAILED DESCRIPTION

Now, the exemplary embodiments will be described more fully with reference to the accompany drawings. However, the exemplary embodiments may be implemented in various forms and should not be construed as limited to the embodiments set forth herein. Instead, these embodiments are provided so that this disclosure will be thorough and complete, and the concept of the exemplary embodiment will fully be conveyed to those skilled in the art. Same reference signs denote the same or similar structures in the accompany drawings, and thus the detailed description thereof will be omitted.

In the following description, numerous specific details are set forth to provide a sufficient understanding of the present disclosure. However, the present disclosure may also be embodied in other ways than those described herein, and the protection scope of the present disclosure is therefore not affected by the specific embodiments.

In order to realize a human-computer interaction function, a touch-screen emerges as the times require. The most widely used technology currently is a transmission-type capacitive touch technology. The transmission-type capacitive touch technology includes G/G, which uses two substrate glasses including one that may achieve a touch panel function and the other that may achieve a protection function; G/FF, which may embed the touch panel function into two polyester films and may be protected by the glass substrates; OGS (One Glass Solution), which is one-piece touch way; Oncell, which may embed the touch screen between a color filter substrate and a polarizer; Incell, which may embed the touch panel function into a liquid crystal pixel, etc. In a process of the product development, a film structure (involving the parameters, such as length, width and height of the film) and a mating gap (including a distance between the film and the side walls of the plastic frame, and a distance between the film and the display unit) often need to be adjusted to meet the final product requirements. In the past, both the film structure and the mating gap refer to a structural adjustment for the plastic frame, need to perform mold requiring, and even mold re-opening of the plastic frame, which will undoubtedly increase the product development cycle and cost.

For the liquid crystal display devices of the same type and size (such as 11.6-inch or 13.3-inch, etc.), appearance of some liquid crystal display devices may be shared. Size of the film, thickness of the display unit, a gap between the display unit and the film, and a gap between the film and the side walls of the plastic frame which need to perform mold repairing and even mold re-opening to cause the verification and size guide time longer, need to be adjusted in order to meet the thickness and optical parameters (to meet temperature and humidity verification requirements) of the newly developed backlight module assembly, and edges of the display unit are also prone to bright edges (bright areas) and edge shadows (dark areas) and other issues.

The backlight module assembly, the structural adjustment method and the display device according to some embodiments of the present disclosure are described in conjunction with the accompanying drawings.

The present disclosure provides a backlight module assembly, as shown in FIG. 1, including a plastic frame 1, a film 2 and an adjustment sheet 3.

Figure 2:
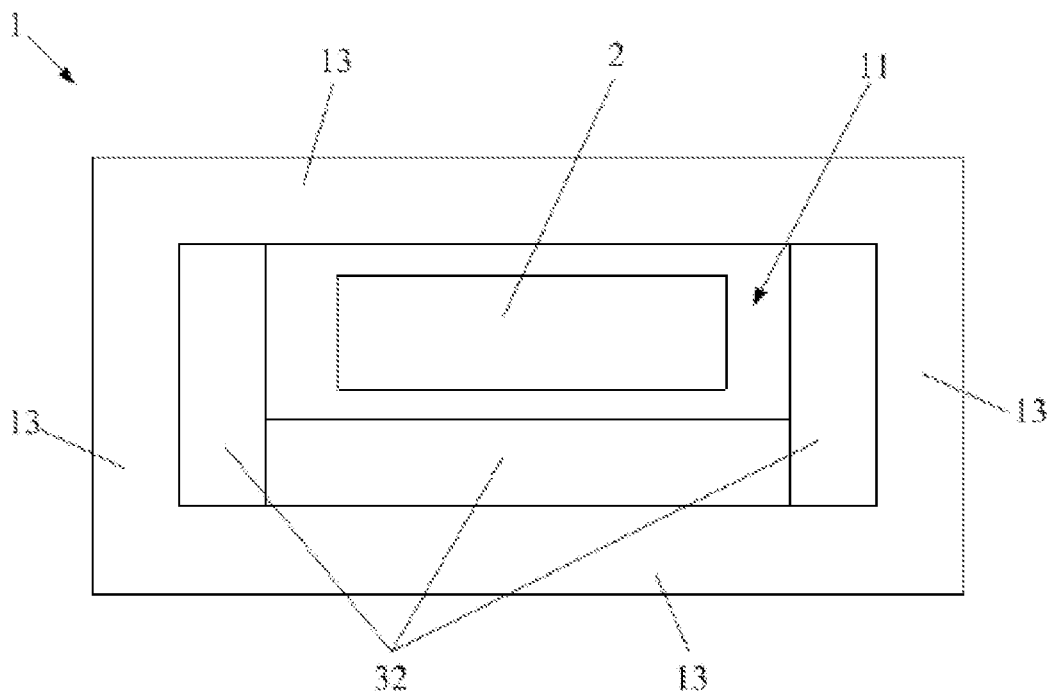
FIG. 2 is a top view of the backlight module assembly as shown in FIG. 1.

The plastic frame 1 is presented at a box shape, with an opening at its top, and has side walls and a bottom wall. A space enclosed by the side walls and the bottom side is a mounting groove. As shown in FIG. 2, in this embodiment, the plastic frame 1 is rectangular and has four side walls 13 and one bottom wall 14.

The film 2 is arranged on the bottom wall 14, and received in the mounting groove 11.

The adjustment sheet 3 is located within the mounting groove 11 and arranged at the side walls of the mounting groove 11.

The adjustment sheet 3 is mounted at the side walls of the plastic frame 1. Adjustment for width of the adjustment sheet 3 may change size of the mounting groove 11 to adapt to size variation of the film 2, so as to avoid repairing a mold or re-opening a mold to share the plastic frame 1, such that the backlight module assembly may realize a rapid verification assembly and perform a fast temperature and humidity verification.

Figure 4:
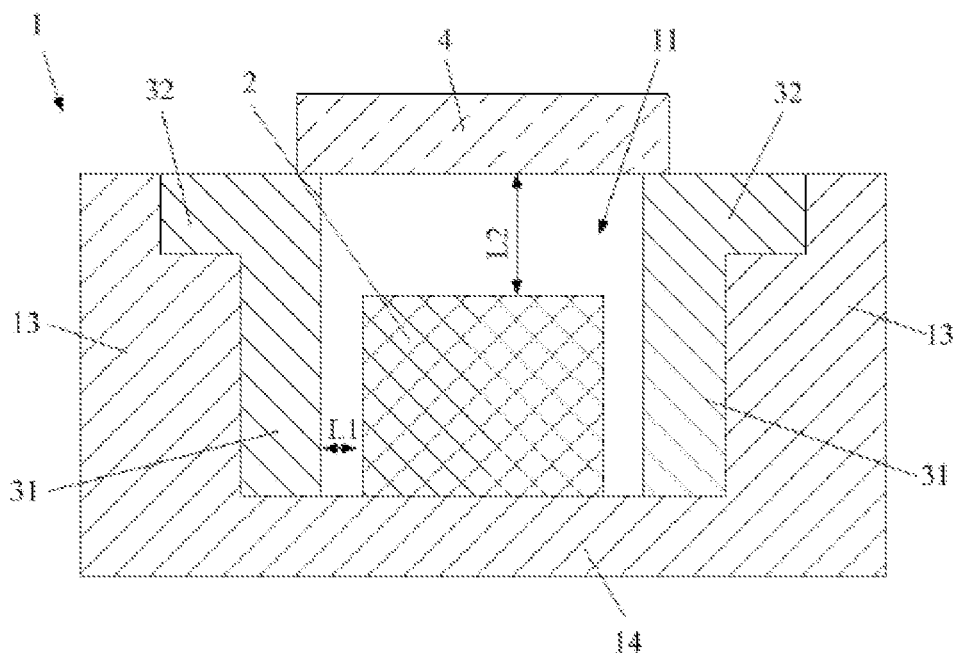
FIG. 4 is a sectional schematic view of a display device according to another embodiment of the present disclosure.

Optionally, as shown in FIG. 1 and FIG. 4, the adjustment sheet 3 is of L-shaped and includes vertical parts 3 and horizontal parts 32 connected with each other at one end portions. Wherein an orthographic projection of the adjustment sheet 3 and an orthographic projection of the side wall 13 do not overlap. In one embodiment, a first set distance L1 is presented between the vertical part 31 and the film 2, and a second set distance L2 is presented between a top surface of the horizontal part 32 and the film 2. As shown in FIG. 4, after a display unit 4 is mounted on the backlight module assembly, an edge of the display unit 4 abuts against the outer end face of the horizontal part 32, and a distance between the display unit 4 and the film 2 is the second set distance L2.

The present disclosure provides a backlight module assembly, which may adapt to size adjustment of the film 2, adjustment of the second set distance L2 and/or adjustment of the first set distance L1 by changing height or width of the adjustment sheet 3. The backlight module assembly is manufactured to be a display device to adapt to the size adjustment of the display unit 4 by changing the height and width of the adjustment sheet 3, such that the size-changed backlight module assembly may be quickly guided into assembling and realize the temperature and humidity verification of the backlight module assembly. As for size-approximate backlight module assemblies, adjustment for size of the adjustment sheet 3 may share the plastic frame 1 to some extent without mold-repairing and opening a new mold, to reduce produce development cycle and cost effectively.

Figure 3:
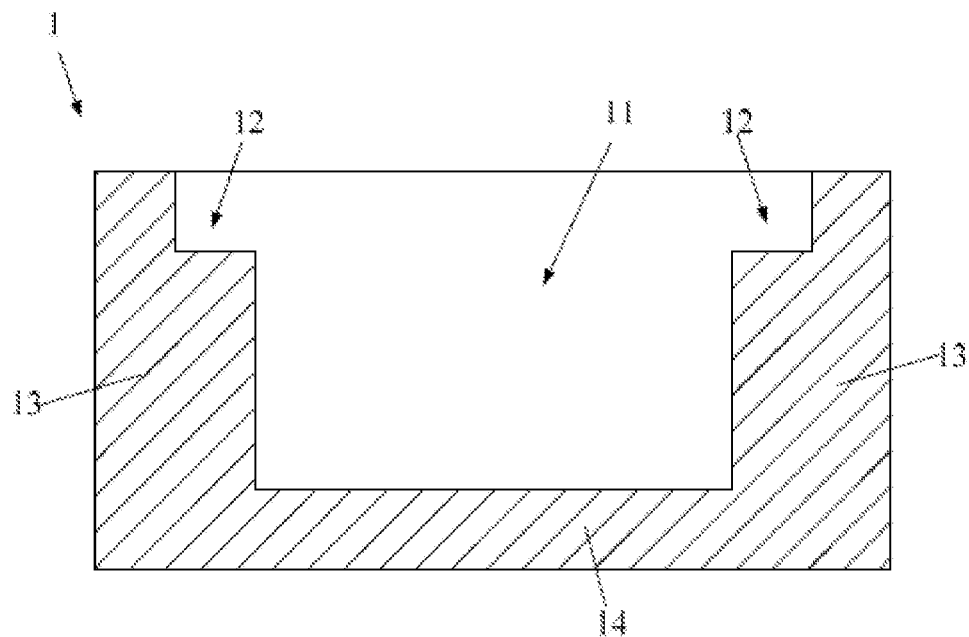
FIG. 3 is a sectional schematic view of a plastic frame of the backlight module assembly in FIG. 1.

Optionally, as shown in FIG. 1 and FIG. 3, limiting slots 12 are provided in the inner sides of the top of the three side walls 13 of the plastic frame 1, respectively. The vertical part 31 are located within the mounting groove 11, preferably, abuts against the bottom wall of the mounting groove 11. The horizontal part 32 coincides with the limiting slot 12 in shape, fits into the limiting slot 12, preferably, abuts against the bottom wall of the limiting slot 12. In one embodiment, the limiting slot 12 has a bottom surface 121 substantially parallel to the bottom wall 14 and a side surface 122 substantially parallel to the side wall 13. The horizontal part 32 of the adjustment sheet 3 is substantially parallel to the bottom wall 14, and the vertical part 31 of the adjustment sheet 3 is substantially parallel to the side wall 13. Wherein the horizontal part 32 is located on the bottom surface 121 of the limiting groove 12, and the vertical part 31 abuts against the side wall 13 of the mounting groove 11. The other end portion 320 of the horizontal part 32 abuts against the side surface 122 of the limiting slot 12, and the other end portion 310 of the vertical part 31 abuts against the bottom wall 14.

Of course, in the other embodiments, the adjustment sheet 3 also may be presented in an elongated shape, also may achieve the object of the present application but not deviate from design concept of the present disclosure, will be omitted herein, all of which should be within the scope of the present application.

Particularly, as shown in FIG. 1 to FIG. 3, the plastic frame 1 is rectangular and has four side walls 13. The mounting groove 11 defined by four side walls 13 and one bottom wall is a rectangular slot. There are three adjustment sheets 3 and three limiting slots 12. The three adjustment sheets 3 are correspondingly provided on the three of the four side walls 13 of the plastic frame 1, which has three side walls of the limiting slot 12, and the adjustment sheet 3 in the middle abuts against the adjustment sheets 3 on both sides. A light source may be arranged on the side walls of the mounting groove 11 without providing the adjustment sheets 3, and no limiting slot 13 are on the side wall 13.

Optionally, the plastic frame 1 is a one-piece structure.

Optionally, there is an absorbance area with different absorbance on the adjustment sheet 3.

According to bright and dark areas at edges of the display unit 4, colors of the various absorbance areas of the adjustment sheet 3 may be set correspondingly to increase absorption or reflection of light on the sides, to solve the problems of the bright and dark areas at the edges of the display unit 4, such that the brightness at the edges is consistent with the brightness at the center of the display unit 4.

The present disclosure provides a display device, as shown in FIG. 4, including the backlight module assembly according to any one of the above embodiments.

The display device according to the present disclosure has all advantages of the backlight module assembly according to any one of the above embodiments, herein omitted.

Optionally, as shown in FIG. 4, the display device further includes a display unit 4. The display unit 4 is located at an opening of the mounting groove 11, and abuts against the outer end face of the adjustment sheet 3.

The display device according to the present disclosure may adapt to the size adjustment of the display unit 4 by changing height or width of the adjustment sheet 3, under a circumstance of satisfying a request for temperature and humidity of the backlight module assembly, the size-changed backlight module assembly may be quickly guided into assembling without mold-repairing and mole re-opening of the plastic frame, to reduce the produce development cycle and cost effectively.

A structural adjustment method of the backlight module assembly according to the present disclosure (not shown) is adapted to the size adjustment of the film, the adjustment of the second set distance and the size adjustment of the display unit and/or the adjustment of the first set distance by changing the size of the adjustment sheet.

Particularly, it is adapted to thickness adjustment of the film, adjustment of the second set distance, and/or thickness adjustment of the display unit by changing thickness of the horizontal parts of the adjustment sheet. It is adapted to length adjustment of the film, width adjustment of the film, adjustment of the first set distance, length adjustment of the display unit, and/or width adjustment of the display unit by changing width of the vertical parts of the adjustment sheet.

For example, when the whole thickness of the backlight module assembly (axis direction of the mounting groove), the thickness of the film or the thickness of the display unit are need to be adjusted, it may be realized by adjusting the thickness of the horizontal parts of the adjustment sheet within design safety range of the second set distance. For example, the thickness of the existing backlight module assembly needs to be reduced by 0.03 mm, but the existing optical design has already satisfied for the requirement, it may be measured that the size of the second set distance may be reduced by 0.03 mm (the changed second set distance may still meet the optical design requirements), that is, the optical design of the backlight module assembly structure has not been altered by reducing the thickness of the horizontal part of the adjustment sheet.

When the length or width of the film needs to be adjusted, it may be realized that the width of the vertical parts of the adjustment sheet may be adjusted within the design safety range of the first set distance. For example, the width F2 of the existing film is reduced by 0.03 mm, it may be determined that the size of the existing first set distance has already satisfy for the design, the optical design of the backlight module assembly structure has not been altered by increasing the width of the vertical parts of the corresponding adjustment sheet by 0.03 mm.

As verifying the temperature and humidity, the first set distance and the second set distance may be adjusted correspondingly by adjusting the thickness of the horizontal parts and the width of the vertical parts of the adjustment sheet, and the thickness of the horizontal parts and the width of the vertical parts of the adjustment sheet according to size variation of the film, in order to verify the optical design of the backlight module assembly quickly.

Optionally, the bright and dark areas at the edges of the display unit may be adjusted by changing absorbance of the absorbance areas on the vertical parts of the adjustment sheet, such that the brightness at the edge is consistent with the brightness at the center of the display unit.

For example, the brightness at the edges of the display unit is too high, as a result, bright spots appear at the edges of a display screen, the areas of the vertical parts of the adjustment sheet corresponding to the bright spots on the surface of the film are displayed in blank color, light absorption between the adjustment sheet at the bright spot and the edges of the display unit may be increased, light leakage may be reduced, and the edge brightness of the display unit may be reduced to overcome problem of bright edges.

In summary, the backlight module assembly according to the present disclosure, has the adjustment sheets mounted at the side walls of the plastic frame, and may change the size of the plastic frame by adjusting the width of the adjustment sheet and adapt to the size variation of the film, to avoid mold repairing or mold re-opening of the plastic frame, so as to share the plastic frame, such that the backlight module assembly may realize quick verification and assembling, and perform a fast verification for the temperature and humidity.

Furthermore, the backlight module assembly may adapt to size adjustment of the film, adjustment of the second set distance and/or adjustment of the first set distance by changing height or width of the adjustment sheet. The backlight module assembly is manufactured to be a display device to adapt to the size adjustment of the display unit by changing the height and width of the adjustment sheet, such that the size-changed backlight module assembly may be quickly guided into assembling and realize the temperature and humidity verification of the backlight module assembly. As for size-approximate backlight module assemblies, adjustment for size of the adjustment sheet may share the plastic frame to some extent without mold-repairing and mold re-opening, to reduce produce development cycle and cost effectively.

According to bright and dark areas at edges of the display unit, colors of the various absorbance areas of the adjustment sheet may be set correspondingly to increase absorption or reflection of light on the sides, to solve the problems of the bright and dark areas at the edges of the display unit, such that the brightness at the edges is consistent. with the brightness at the center of the display unit.

In the description of the present disclosure, the terms "mount", "connect", "fix" and the like should be broadly understood. For example, "connect" may be a fixed connection, and also a removable connection or an integral connection, and may be a direct connection, and also indirect connection through an intermediary connection. For those skilled in the art, the specific meaning of the above terms in the present disclosure may be understood according to the specific situations.

Any reference in this specification to "one embodiment" "some embodiments" and "specific example" etc., means that a particular feature, structure, material or characteristic described in connection with the embodiment is included in at least one embodiment of the example. The appearances of such phrases in various places in the specification are not necessarily all referring to the same embodiment or example. Further, when a particular feature, structure, material or characteristic is described in connection with any one or more embodiments or examples.

Although the invention has been described with reference to several exemplary embodiments, it is understood that the words that have been used are words of description and illustration, rather than words of limitation. It should also be understood that the above-described embodiments are not limited by any of the details of the foregoing description, without departing from the spirit or essential characteristics of the present disclosure. However, the extent for patent protection of the present disclosure still should be defined by the appended claims.

What is claimed is:

1. A backlight module assembly, comprising:
    a plastic frame having a side wall and a bottom wall, and wherein a space enclosed by the side wall and the bottom wall is a mounting groove with an opening on its top;
    a film, arranged on the bottom wall, facing the opening and received within the mounting groove; and
    an adjustment sheet, arranged on an inner side of the side wall of the mounting groove, wherein an orthographic projection of the adjustment sheet on the bottom wall and an orthographic projection of the film on the bottom wall do not overlap;
    wherein the adjustment sheet comprises a vertical part and a horizontal part, a first set distance is provided between the vertical part and the film, and a second set distance is provided between a top surface of the horizontal part and the film;
    wherein a limiting slot is provided in the inner side, on a top of the side wall of the mounting groove, wherein the limiting slot has a bottom surface substantially parallel to the bottom wall and a side surface substantially parallel to the side wall;
    the adjustment sheet comprises a horizontal part substantially parallel to the bottom wall and a vertical part substantially parallel to the side wall, one end portion of the horizontal part is connected with one end portion of the vertical part;
    wherein the horizontal part is located on the bottom surface of the limiting groove, and the vertical part abuts against the side wall of the mounting groove.

2. The backlight module assembly according to claim 1, wherein the plastic frame is rectangular and has four side walls, there are three adjustment sheets which are correspondingly arranged on three side walls of the plastic frame, and the adjustment sheet located in the middle abuts against the adjustment sheets located on the both sides.

3. The backlight module assembly according to claim 2, wherein the plastic frame is a unitary structure.

4. The backlight module assembly according to claim 2, wherein the adjustment sheet has absorbance areas with different absorbance.

5. The backlight module assembly according to claim 1, wherein the plastic frame is a unitary structure.

6. A display device, comprising: a backlight module assembly according to the claim 1, and
    a display unit arranged on a top end face of the adjustment sheet.

7. The display device according to claim 6, wherein the plastic frame is rectangular and has four side walls, there are three adjustment sheets which are correspondingly arranged on three side walls of the plastic frame, and the adjustment sheet located in the middle abuts against the adjustment sheets located on the both sides.

8. The display device according to claim 6, wherein the plastic frame is a unitary structure.

9. The display device according to claim 6, wherein the adjustment sheet has absorbance areas with different absorbance.

10. The backlight module assembly according to claim 1, wherein the plastic frame is a unitary structure.

11. The backlight module assembly according to claim 1, wherein the adjustment sheet has absorbance areas with different absorbance.

12. A structural adjustment method for a backlight module assembly, the backlight module assembly comprising:
    a plastic frame having side walls and a bottom wall, and wherein a space enclosed by the side walls and the bottom wall is a mounting groove with an opening on its top;
    a film, arranged on the bottom wall and received within the mounting groove; and
    an adjustment sheet, arranged on an inner side of the side wall of the mounting groove, wherein an orthographic projection of the adjustment sheet on the bottom wall and an orthographic projection of the film on the bottom wall do not overlap,
    wherein the adjustment sheet comprises a vertical part and a horizontal part, a first set distance is provided between the vertical part and the film, and a second set distance is provided between a top surface of the horizontal part and the film;
    wherein a limiting slot is provided in the inner side, on a top of the side wall of the mounting groove, wherein the limiting slot has a bottom surface substantially parallel to the bottom wall and a side surface substantially parallel to the side wall;
    the adjustment sheet comprises a horizontal part substantially parallel to the bottom wall and a vertical part substantially parallel to the side wall, one end portion of the horizontal part is connected with one end portion of the vertical part;
    wherein the horizontal part is located on the bottom surface of the limiting groove, and the vertical part abuts against the side wall of the mounting groove;

wherein the structural adjustment method for the backlight module assembly comprises: adaptively changing size of the adjustment sheet according to size adjustment of the film, or size adjustment of a display unit.

13. The structural adjustment method for the backlight module assembly according to claim 12,
the structural adjustment method for the backlight module assembly comprises adaptively changing thickness of the horizontal part of the adjustment sheet according to thickness adjustment of the film, adjustment of the second set distance, or thickness adjustment of the display unit,
adaptively changing width of the vertical part of the adjustment sheet according to length adjustment of the film, width adjustment of the film, adjustment of the first set distance, a length adjustment of the display unit or a width adjustment of the display unit.

14. The structural adjustment method for the backlight module assembly according to claim 12, wherein bright areas and dark areas at an edge of the display unit are adjusted by changing absorbance of the absorbance areas on the vertical part of the adjustment sheet.

* * * * *